United States Patent [19]

Nicklaus

[11] 3,869,782

[45] Mar. 11, 1975

[54] MACHINE FOR WIRING A SEMICONDUCTOR COMPONENT

[75] Inventor: Karl Nicklaus, Steinhausen, Switzerland

[73] Assignee: Esec Sales S. A., Zug, Switzerland

[22] Filed: Nov. 2, 1973

[21] Appl. No.: 412,252

[30] Foreign Application Priority Data

Nov. 10, 1972 Switzerland .......................... 16404/72

[52] U.S. Cl. .............................................. 29/203 B

[51] Int. Cl. ............................................ H05k 13/04

[58] Field of Search ........ 29/203 B, 203 P, 203 DT, 29/203 R, 203 DS

[56] References Cited

UNITED STATES PATENTS

| | | | |
|---|---|---|---|
| 3,713,197 | 1/1973 | Crump | 29/203 B |
| 3,795,962 | 3/1974 | Baldyga | 29/203 B |
| 3,807,019 | 4/1974 | Staiger | 29/203 B |

*Primary Examiner*—Thomas H. Eager

*Attorney, Agent, or Firm*—Toren, McGeady and Stanger

[57] ABSTRACT

In a machine for automatically making wire connections on a semiconductor component between connecting points on an integrated circuit and on a connecting element, the parts of the semiconductor components are placed on a work table rotatably positioned on a machine frame. A working head mounted on a horizontally displaceable first cross carriage makes the wire connections. The first cross carriage is positionable in the horizontal direction in two mutually perpendicular directions and is supported on a similarly horizontally positionable second cross carriage which locates the machine in the starting position. A pair of positioning units are mounted on the machine frame and are releaseably coupled to the first cross carriage. One positioning unit locates the working head at the connecting points on the integrated circuit and the other positioning unit effects a similar operation for the connecting points on the connecting element. Each of the positioning units includes a program plate having countersunk holes with the holes in one plate corresponding to the spacing of the connecting points on the integrated circuit and the holes in the other plate corresponding to the spacing of the connecting points on the connecting elements. Additionally, in each positioning unit another plate is provided for supporting vertically movable pins, one for each of the countersunk holes. The pins are mutually spaced apart and are arranged out of alignment with the holes. By selectively inserting the pins into the holes into the program plates of the positioning unit, the working head can be exactly positioned for making the wire connections between the integrated circuit and the connecting element.

9 Claims, 3 Drawing Figures

PATENTED MAR 1 1 1975 3,869,782

MACHINE FOR WIRING A SEMICONDUCTOR COMPONENT

SUMMARY OF THE INVENTION

The present invention is directed to a machine for wiring a semiconductor element and, more particularly, it concerns an arrangement for automatically locating a working head in position for making the wire connections between connecting points on an integrated circuit and on a connecting element of the semiconductor component.

In the present invention a wiring machine is arranged to automatically effect wire connections between connecting points on an integrated circuit and on a connecting element of a semiconductor component. The machine includes a selectively positionable working head for supplying the wire and soldering it first to a connecting point on the integrated circuit and then extending the wire to and soldering it to a corresponding connecting point on the connecting element. To position the working head it is mounted on a first cross carriage which is movably positioned horizontally in two mutually perpendicular directions and this cross carriage is similarly positionable on a second cross carriage which is also horizontally movable in two mutually perpendicular directions. The second cross carriage locates the machine in its starting position.

Releaseably coupled to the first cross carriage is a pair of positioning units with the first one of the units arranged to locate the working head over the connecting points on the integrated circuit and the other unit arranged to position the working head over the connecting points on the connecting element. Each of the positioning units has a horizontally arranged program plate which can be releaseably coupled to the first carriage and the program plate contains a number of countersunk holes corresponding to the connecting points on the related part of the semiconductor component. Further, each positioning unit includes a plate supported on a machine frame and containing a vertically movable pin with a conical point for each of the countersunk holes in its companion program plate. Each of the pin plates has an associated drive mechanism for introducing the pins successively into the holes in the program plates of the two positioning units. The spacing of each hole from a reference hole in two mutually perpendicular directions is equal to the sum of the spacing of the corresponding connecting point from a reference connecting point plus the spacing of the pin correlated with the hole from the pin correlated with the reference hole.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
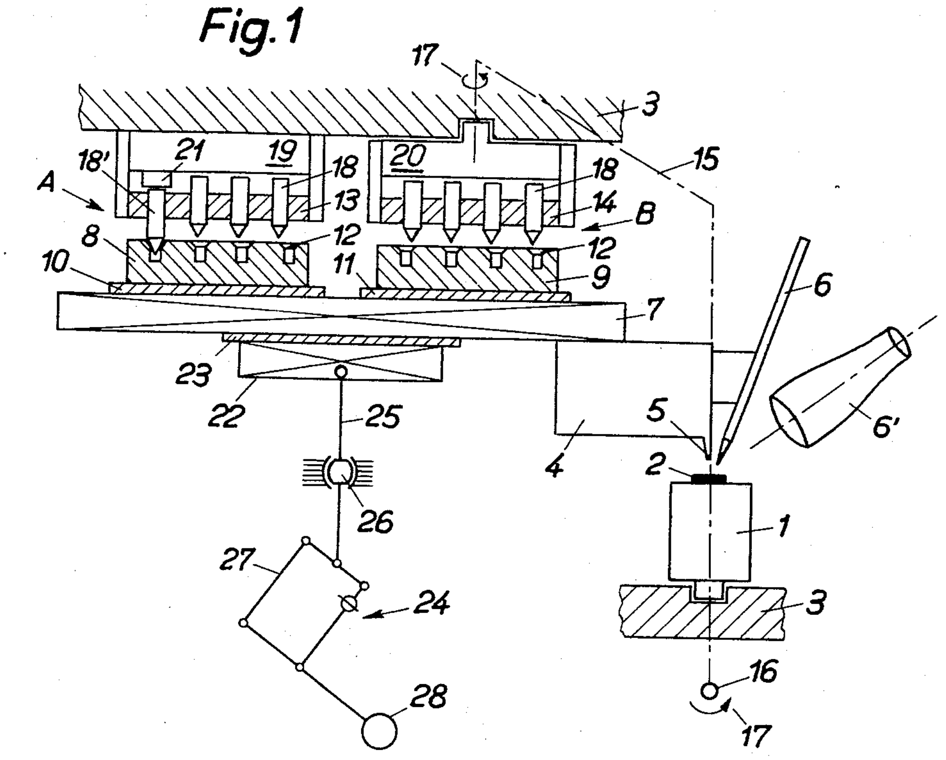
FIG. 1 is a schematic section view of a machine embodying the present invention.

In FIG. 1 the wiring machine of the present invention includes a work table 1 which supports a semiconductor component 2 to be wired with the semiconductor component consisting of an integrated circuit and a platelet having metal connecting tabs arranged in a grid pattern. Connecting points on the integrated circuit are connected to connecting points on the metal tabs of the platelet or connecting element by means of sections of fine wire. To wire a great number of the semiconductor elements, the tabs on the connecting elements are usually interconnected to form longer strips so that, by transporting the strip in a direction perpendicular to the plane of FIG. 1, one grid tab after the other is placed on the work table for wiring the integrated circuit located on it. The work table 1 is rotatably mounted in a fixed machine frame 3 only a portion of which is indicated in the drawing.

A working head 4 which produces the wire connections is positioned above the work table 1. The working head is provided, in a known manner, with a wire guide 5 for the connecting wire which is removed from a supply spool. Further, the head includes a device, not shown, for pulling off the connecting wire tail at the required lengths and for melting the end of the wire into a ball. In addition, the working head also includes devices for raising and lowering the wire guide 5 and for connecting the ball of the wire pieces to connecting points on the integrated circuit and the other end of the wire pieces to the metal tabs on the connecting elements in a sequential manner by the use of thermocompression or ultrasonics. A light spot projector 6 is mounted on the working head and throws a light spot on the connecting point located below the wire guide 5. An observation device 6', such as a stereomicroscope, enables the operator to determine whether the connecting point on the integrated circuit or the grid tab coincides with the light spot.

The working head 4 is dependently supported from a first cross carriage 7 which is horizontally movable in the machine frame in two coordinate directions X and Y which are mutually perpendicular to one another. The manner in which the first cross carriage 7 is movably mounted on the machine frame is not shown in the drawing, however, a roller or ball mounting arrangement could be used. Accordingly, each position of the cross carriage 7 corresponds to a certain position of the working head 4 and also of the wire guide 5 in relation to the work table 1. Two positioning units A and B are associated with the first cross carriage for fixing the required horizontal position of the working head 4 relative to the semiconductor component 2 located on the work table 1 and similarly also locates the horizontal position of the first cross carriage 7. As can be seen in FIG. 1, each of the positioning units A and B comprises a program plate 8, 9, respectively, having a flat lower side which rests on the first cross carriage 7 so that it can be secured to the cross carriage by an adhering coupling 10, 11. The adhering couplings may be operated pneumatically with the cross carriage 7 having holes in it open at the top which communicate through passageways with connections for suction or compressed air. If suction air is supplied through the holes in the cross carriage the program plated 8, 9 are secured to the carriage. However, if compressed air is supplied through the passageways into the holes, the program plates are released or are not held to the carriage. Alternatively, electromagnetic adhering couplings 10, 11 could be used in which the energization of an electromagnet secures each of the associated ferromagnetic program plates 8, 9 onto the cross carriage 7.

Each of the program plates contains a number of blind holes 12 extending downwardly from the upper surface of the plate and each of the holes is countersunk with the countersunk surfaces having a frustoconical configuration. Details of the program plates 8, 9 will be discussed subsequently with regard to FIGS. 2 and 3.

In each positioning unit A and B another plate 13, 14 is located above the program plate 8, 9. As shown in FIG. 1, plate 13 of positioning unit A is fixed to the machine frame 3 while plate 14 of positioning unit B is mounted on the machine fram 3 so that it can rotate in a horizontal plane but cannot move in the vertical direction. Plate 14 is joined to the work table 1 by a linkage 15 equipped with an actuating member 16, such as a knob, so that, when the knob is actuated, the work table 1 and the plate 14 perform a rotary motion relative to the machine frame, each moving through the same number of degree, as indicated by the arrow 17.

Figure 3:
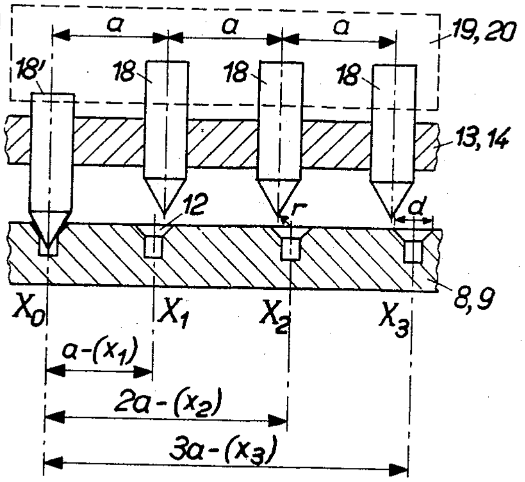
FIG. 3 is an enlarged sectional view of a portion of the machine shown in FIG. 1.

Each of the plates 13, 14 is equipped with a number of positioning pins 18 located within holes in the plates and being movable in the vertical direction. The number of pins 18 in each plate 13, 14 coincides with the number of blind holes 12 in the associated program plates 8, 9. As shown in FIGS. 1 and 3, the lower end of each positioning pin is conically shaped and the included angle of the conical points match the included angle of the countersunk surfaces of the blind holes 12. Accordingly, one of the pins 18 can be lowered from its normally raised position into contact with the countersunk surfaces of the corresponding blind hole, note pin 18' in the lowered position as illustrated in FIGS. 1 and 3. Therefore, when a pin 18 is lowered into the corresponding blind hole 12 located below it in one of the program plates 8 and 9, the program plate containing the hole aligns itself with the position of the inserted pin and the cross carriage 7 is moved in two mutually perpendicular horizontal directions as long as it is held to the program plates by the adhering couplings 10, 11. This displacement of the cross carriage 7 effects the positioning of the wire guide 5 of the working head 4, as will be described in detail later in the specification.

To actuate the pins successively and in an alternating manner between positioning unit A and positioning unit B, a pressure or drive mechanism 19, 20 is associated with each of the positioning units, as indicated schematically in FIG. 1. For example, by means of a spring associated with each of the pins 18, they are held in the upper rest position indicated in FIGS. 1 and 3. By means of a plunger 21 in the drive mechanisms 19 and 20, operated pneumatically, electromagnetically or electromotively, a pin in one of the positioning units A or B is displaced downwardly into its corresponding blind hole 12 in the subjacent program plate in a time interval in accordance with a predetermined control program for the machine.

By alternating the use of the two positioning units A and B, the working head 4 and its wire guide 5 can be moved successively into position for effecting each of the wire connections to be made between the integrated circuit and the associated grid tab or connecting element of a semiconductor component. As a result, the positioning unit A fixes the position of the working head for the connecting points on the integrated circuit and the positioning unit B fixes the position of the working head for the corresponding connecting points of the connecting element.

The mutual spacing of the pins 18 in plates 13, 14 in each of the positioning units A and B is fixed in both coordinate directions $x$ and $y$. Accordingly, the pin support plates 13, 14 are fixed to the machine frame and do not have to be adapted to the coordinates of the connecting points in each series of semiconductor components to be wired. In contrast, however, the blind holes of the program plates 8, 9 are positioned so that they deviate from the location of the corresponding pins 18 in the plates 13, 14 in the $x$ and $y$ directions by amounts corresponding to the respective $x$ and $y$ coordinate dimensions of the connection points on the integrated circuit or the connecting elements which are to be wired. When the pins are pushed, in turn, into the blind holes 18, the pins are not coaxial relative to their associated line holes 12, so that, upon the introduction of the conical point of the pin into the countersunk portion of the blind hole, the program plate 8 or 9 is moved in the $x$ and/or $y$ direction and, since the program plate is firmly secured to the first cross carriage 7 by means of its associated adhering coupling, the working head 4 is displaced by a corresponding amount so that the wire guide assumes a position relative to the parts of the semiconductor component as determined by the positioning unit A or B.

Figure 2:
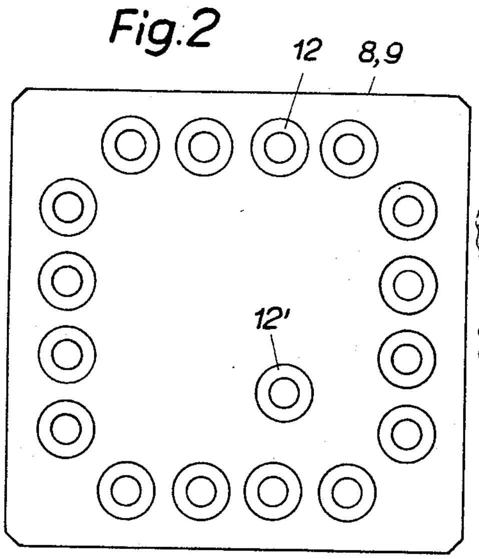
FIG. 2 is a top view of a program plate incorporated into the machine.

As shown in top view in FIG. 2, the program plates 8, 9 contain 16 countersunk blind holes 12 arranged in accordance with 16 connecting points located on the integrated circuit and on the connecting element of the semiconductor component. Further, an additional blind hole 12' serves to locate the program plates in the initial position for the commencement of the wiring operation on each semiconductor component.

Because the small deviations of the coordinates of the blind holes 12 in the $x$ and/or $y$ directions from the fixed positions of the corresponding pins 18 in plate 13, 14 are not shown in FIG. 2, FIG. 3 illustrates a section through the program plate 8, 9 and the pin support plate 13, 14 with the section passing through four successive blind holes 12. For the purpose of simplifying the drawing it is assumed that these four blind holes lie in one line.

As indicated in FIG. 3, the mutual spacing of the centerlines of the pins 18 in the plates 13, 14 is designated by $a$. The drive mechanisms 19, 20 for the pins 18 are shown only in diagrammatic form. Further, it is assumed that the corresponding connecting points on the integrated circuit or the grid tab have the $x$-coordinates $x_0$, $+x_1$, $-x_2$ and $-x_3$. As a result, the blind holes in the program plate 8, 9, firmly secured to the first cross carriage 7, are offset relative to the corresponding pins 18 in accordance with the $x$-coordinate values of the connecting points. Therefore, the first blind hole 12 into which the pin 18' is shown inserted in FIG. 3, has a certain $X_0$-coordinate which serves as a reference point. The second blind hole 12, that is the one next to the blind hole serving as a reference point, has the coordinate $X_1 = a - (X_1)$, that is, the spacing between this hole and the reference hole is smaller by the amount $+x_1$ than the mutual spacing $a$ of the corresponding pins 18', 18. The third blind hole, that is the next in line, has the coordinate $X_2 = 2a - (x_2)$ and, thus, is spaced further from the first blind hole than its corresponding pin by $+x_2$. Finally, the fourth blind hole in the line has the coordinate $X_3 = 3a - (x_3)$, and its spacing from the first blind hole is greater than the spacing of its corresponding pin from the hole by $+x_3$.

In like manner, the blind holes in the plane perpendicular to the plane of FIG. 3 are offset relative to the fixed $y$-coordinates of the pins 18', 18 by the $y$-coordinates of the connecting points on the integrated circuit or on the connecting element.

It can be appreciated from FIG. 3 that a relationship exists between the maximum movement of the program plate 8, 9 in one coordinate direction as caused by the successive lowering of two adjacent pins 18 and the size of the countersunk portion of the blind holes 12. To make it possible for a pin 18 to be introduced into a blind hole which is offset in relation to it and has a large diameter $d$ for its countersunk portion, it is necessary that the offset in one coordinate direction be smaller than half the diameter $d$ of the countersunk portion less the radius $r$ of the conical point of the pin 18. In other words, the difference between the coordinates in one direction of two connecting points of the integrated circuit on the one hand and of the tabs on the connecting element to which the connecting wire is to be soldered on the other hand must be smaller than the value mentioned. For example, if the diameter $d$ of the countersunk portion of the blind hole is 10mm, this distance may be almost 5mm in one coordinate direction. However, because this condition relates to coordinate differences between connecting points soldered in direct succession, the greatest possible coordinate difference for connecting points not soldered in direct succession is considerably greater so that there is practically no restriction.

Furthermore, the machine illustrated in FIG. 1 is equipped with devices which permit the alignment of the program plates 8, 9 and, hence, of the working head 4 and its wire guide 5 relative to the respective position of the semiconductor component 2 on the work table 1 so that the first connecting point of the semiconductor component, and, consequently, all succeeding connecting points of the same component are provided with the connecting wires where required.

A second cross carriage is mounted in the machine frame 3 below the first cross carriage 7 and it can be secured to the first cross carriage by a controllable adhering coupling 23. A known manipulator 24 has a manipulating arm 25 mounted in the machine frame by means of a ball 26 and affords the movement of the second cross carriage 22. The displacement of the manipulating arm is effected over a parallelogram linkage assembly 27 which is also mounted in the machine frame and, for purposes of clarity, have been rotated into the plane of FIG. 1, though the linkage assembly in fact is located in a plane perpendicular to the plane of FIG. 1. An actuating handle 28 is operatively secured to the linkage assembly 27. The second cross carriage 22 can be moved in both the $x$ and $y$ directions by means of the manipulator 24 and, at the same time, will similarly move the first cross carriage 7 if the adhering coupling 23 is engaged, the couplings 10 and 11 are released and the program plates 8 and 9 are held in position by means of pins 18 and respective countersunk holes 12 and 12'.

Another adjusting mechanism includes the linkage 15, which connects the rotatable work table 1 with the rotatable plate 14 of positioning unit B, and it has been described above.

Additionally, this wiring machine includes a program control system, not shown, which generates the control commands required for the desired sequence of movement and operation as described below.

The integrated circuit of a semiconductor component 2 is supported on the work table 1 and is first lined up with cross hairs in the stereomicroscope 6' by turning the work table 1 by means of the knob 16. During this operation, the coupling 11 between the positioning unit B and the first cross carriage 7 is disengaged and two pins 18 in the positioning unit's plate 14 are displaced into the respective blind holes 12 and 12' of the program plate 9 so that the positioning unit B is turned by the same number of degrees as the work table relative to the positioning unit A. This rotational movement assures that the relative angular position of the positioning units A and B in the horizontal plane coincides with that of the integrated circuit and its connecting element. When this positioning operation has been completed, the two pins are retracted upwardly.

Next the adhering couplings 10 and 11 of the two positioning units A and B are disengaged and the coupling 23 of the manipulator 24 is engaged. The light spot from the light spot projector 6 is directed against a first reference connecting point on the integrated circuit by means of the manipulator 24 after a pin 18 of the positioning unit A has been displaced downwardly into a blind hole 12 in the program plate 8 which corresponds to the reference connecting point. Following this operation, the program plate is fixed to the cross carriage by engaging the adhering coupling and the pin which had been lowered is raised. As a result, the program plate 8 is now properly adjusted.

Continuing the adjustment of the machine, a pin 18 of the positioning unit B is inserted into the blind hole 12 by its program plate 9 which corresponds to the first connecting point on the connecting element which is to be connected with the reference connecting point on the integrated circuit by a piece of wire. With the adhering coupling 11 of the positioning unit B released, the light spot is directed against this first connecting point of the grid plate by operating the manipulator 24. The coupling 11 is then engaged and the pin which has been lowered is raised and the coupling 23 of the manipulator is disengaged. Accordingly, the program plate 9 is also properly adjusted. The above adjustment can be made at the same time with the rotational adjustment described before.

After these adjustment steps, the actual wiring operation takes place automatically without the need for any further manual adjustments. The control system, not shown, moves the first pin 18 into the program plate 8 of positioning unit A and, as a result, the working head is moved into the required position for soldering the first connecting point to the integrated circuit. After the first pin is raised from the program plate 8, the first pin associated with the positioning unit B is inserted into the program plate 9 and the working head is adjusted and the wire is pulled to the appropriate connecting point on the connecting element. With the connecting wire properly positioned, it is soldered to the connecting point on the connecting element and is cut off. When the pin in positioning unit B is lifted the next pin 18 in positioning unit A is displaced into the program plate 8 and the working head 4 is located over the next connecting point on the integrated circuit. These soldering and positioning operations are continued until all of the wire connections are made and then the next semiconductor element is positioned on the work table, any adjustments which may be necessary are carried out and then the wire connections are made.

The machine described offers not only the advantage of enabling the desired wire connections to be made exactly and automatically by the appropriate selection and replacement of program plates, but also it has the advantage that the program plates can be adjusted in an uncomplicated manner with the location of the integrated circuit relative to the corresponding connecting element being taken fully into account, in both the *x* and *y* directions and also with respect to possible distortion which may occur.

While a specific embodiment of the invention has been shown and described in detail to illustrate the application of the inventive principles, it will be understood that the invention may be embodied otherwise without departing from such principles.

What is claimed is:

1. Machine for wiring a semiconductor component including an integrated circuit and a connecting element, comprising a machine frame, a working head for supplying and soldering wires to the integrated circuit and the connecting element for effecting wire connections between corresponding connecting points on the integrated circuit and the connecting element, a first cross carriage movable horizontally in two mutually perpendicular directions, said working head mounted on said cross carriage for movement therewith, a first positioning unit coordinated with the connecting points on the integrated circuit, a second positioning unit coordinated with the connecting points on the connecting element, each of said first and second positioning units comprising a horizontally arranged program plate, means for individually and releaseably securing said program plates to said first cross carriage, each of said program plates having a number of laterally spaced vertically extending countersunk holes, with the sides of said countersunk portion of said holes having a frustoconical configuration converging inwardly into said program plate, each of said first and second positioning units including a support means mounted on said machine frame and aligned opposite and in facing relationship with the surface containing said countersunk holes in said program plate of the same said positioning unit, each of said support means includes a plurality of vertically displaceable pins with each of said pins arranged to correspond to a different one of said countersunk holes and having a conically shaped point, the spacing of each said countersunk hole in said program plate from a reference hole, in two mutually perpendicular directions, being equal to the sum of the spacing of the connecting point to which the hole corresponds from a reference connecting point plus the spacing of said pin corresponding to the hole from said pin corresponding to the reference hole, and each of said support means includes a drive mechanism for the introduction of said pins into said countersunk holes so that the introduction can be effected alternately between said first and second positioning units and in succession with respect to said pins in one said support means.

2. Machine, as set forth in claim 1, wherein the conically-shaped points of said pins have an included angle matching the included angle of the surface of the countersunk portion of said holes.

3. Machine, as set forth in claim 1, wherein said means for releaseably securing said program plates to said first cross carriage comprises a releaseable coupling device for each said program plate.

4. Machine, as set forth in claim 3, wherein said coupling device is pneumatically operated for effecting the securement of said program plate to and its release from said cross carriage.

5. Machine, as set forth in claim 1, wherein each of said support means comprises a horizontally arranged plate dependently secured to said machine frame, a plurality of vertically extending holes in said plate and said pins each positioned within and vertically movable through one of said holes.

6. Machine, as set forth in claim 5, wherein said drive mechanism for said pins comprises plungers for displacing individual ones of said pins into said countersunk holes and retaining means for holding said pins in position displaced from said countersunk holes.

7. Machine, as set forth in claim 1, wherein each said program plate has one countersunk hole in addition to those corresponding to the connecting points on said integrated circuit connecting element, and an additional pin in said support means arranged to correspond to the additional said countersunk hole for moving said cross carriage into a starting position.

8. Machine, as set forth in claim 1, wherein said horizontally arranged plate of said support means of said second positioning unit is rotatably mounted in said machine frame, a work table, for supporting the semiconductor element rotatably mounted on said machine frame, means linking said work table and said securing means of said second positioning unit so that when said work table is rotated about its vertical axis for aligning the semiconductor, said support means linked to it is rotated by the same angular degree.

9. Machine, as set forth in claim 1, wherein a second cross carriage is positioned below said first cross carriage, releaseable means for selectively coupling said first and second cross carriages together, said second carriage being movable in the horizontal direction in two mutually perpendicular directions, a manipulator connected to said cross carriage and mounted in said machine frame for positioning said first and second program plates on said first cross carriage in a starting position.

* * * * *